Oct. 7, 1969

D. L. ST. ONGE 3,471,219

12.5X MAGNIFICATION SEMIOBJECTIVE WITH FIELD FLATTENING LENS

Filed March 26, 1968

DAVID L. ST. ONGE
INVENTOR.

BY *Bernard*

AGENT

United States Patent Office 3,471,219
Patented Oct. 7, 1969

3,471,219
12.5× MAGNIFICATION SEMIOBJECTIVE WITH FIELD FLATTENING LENS
David L. St. Onge, Williamstown, Mass., assignor to Bausch & Lomb Incorporated, Rochester, N.Y., a corporation of New York
Filed Mar. 26, 1968, Ser. No. 716,113
Int. Cl. G02b 9/60
U.S. Cl. 350—216          7 Claims

ABSTRACT OF THE DISCLOSURE

An apochromatic microscope semiobjective having substantially 2.5× magnification per se, which is designed for use with an associated negative field flattening lens having substantially 5.0× magnification per se so as to produce cooperatively a total magnification of substantially 12.5× per se and a numerical aperture of 0.30. The semiobjective is one of a set of such semiobjectives of different powers which are used interchangeably with the field flattening lens.

BACKGROUND OF THE INVENTION

This invention is related to microscope optical systems and is more particularly concerned with improvements in the objective system thereof.

A semiobjective of the kind described hereinbelow is intended for use in cooperative association with a plurality or set of other related semiobjectives in a rotatable microscope nosepiece, the individual semiobjectives having different respective magnifications covering a large range of mage magnification varying from low to high power. Each such semiobjective is corrected aberrationwise together with a single stationary prescribed negative corrector lens which is so constructed as to produce the best practical overall correction of the aberrations for the entire set of semiobjectives and to act as a field flattener. In particular, the instant semiobjective together with the negative corrector lens is corrected aberrationwise for four different wavelengths, red, green, blue, and violet, in a low power lens system.

With regard to the prior art, the microscope objective most nearly approaching the general optical structure disclosed herein is shown in United States Patent No. 3,174,396 by Paul L. Ruben, which is assigned to the same assignee as the present application. However, there are a number of distinguishing features between the respective lens systems and the characteristics thereof. Initially, subject invention is an apochromatic lens system while the objective disclosed in the patent is an achromat. This additional and formidable feature of the present invention necessarily distinguishes it from the objective disclosed in the patent. The advantages to the operator gained by this additional chromatic correction are obvious and need not be discussed herein.

Additionally, the aforementioned prior art objective is of different power of magnification, 30.0×, than is the objective of the present application, 12.5×. Also, the numerical aperture of the present invention is 0.30, while the numerical aperture for the previously disclosed objective is 0.65.

This objective has been designed to be placed into a microscope of the type disclosed in the copending application Ser. No. 408,875, now abandoned, by Harold E. Rosenberger, which is assigned to the same assignee as the present application, and constitutes one of a particular group of objectives designed to operate cooperatively in the manner described therein.

SUMMARY OF THE INVENTION

It is, therefore, an object of the invention to provide a microscope objective having substantially 12.5× magnification per se, with a numerical aperture of 0.30.

It is a second object of the invention to provide such a microscope objective having superior chromatic and spherical aberration correcting qualities so as to result in an apochromatic lens system.

It is another object of the present invention to provide a microscope semiobjective having substantially 2.5× magnification capable of use in cooperative association with a related plurality or set of other microscope semiobjectives of different powers of low to high magnification in a rotatable microscope nosepiece with a common negative field flattening and aberration correcting lens having substantially 5.0× magnification per se.

It is a further object of the present invention to provide such a microscope objective lens system which cooperatively produces an excellent flatfield and substantially corrects other image aberrations including secondary spectrum, Petzval condition, coma, and astigmaism; the construction thereof being comparatively economical when compared to micro-objectives of comparable performance.

Briefly, the invention in its broadest aspect comprises a singlet positive meniscus lens member (I) which is located adjacent to a specimen surface to be examined at an axial distance designated $S_1$ therefrom. A singlet double convex lens member (II) is located at an axial distance designatel $S_2$ rearwardly of lens member I. A first positive doublet lens member (III) is located at an axial distance designated $S_3$ rearwardly of lens member II. Member III includes a front double concave lens element (IIIa) which lies in surface contact with a rear double convex lens element (IIIb). A second positive doublet lens member (IV) is located at an axial distance designated $S_4$ rearwardly of lens member III. Member IV includes a front double convex lens element (IVa) which lies in surface contact with a rear double concave lens element (IVb). The lens member IV is located at an axial distance designated $S_5$ from the aforementioned negative field flattening lens member (V) which includes a front double convex lens element (Va) which lies in surface contact with a rear double concave lens element (Vb).

The ranges of values for the constructional data and the properties of the glasses to be used in the lens system are as specified in the tables hereinbelow.

Further objects, advantages, and features of the invention will be apparent in the arrangement and construction of the constituent parts as set forth in detail in the following specification taken together with the accompanying drawing.

DESCRIPTION OF THE PREFERRED EMBODIMENT

Figure 1:
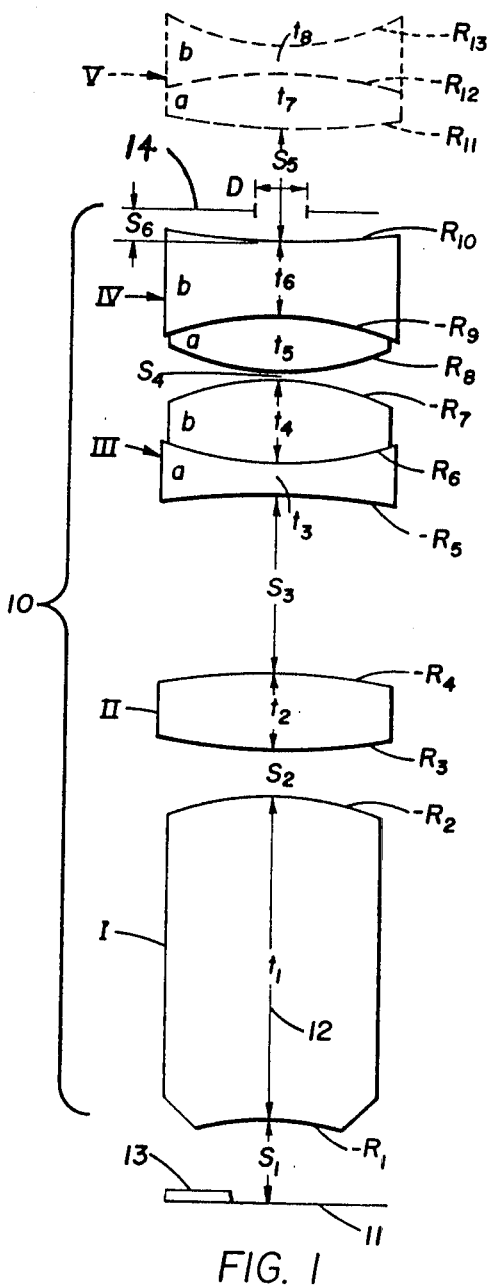
FIGURE 1 is an optical diagram showing a preferred embodiment of the present invention.

In the preferred embodiment of the present invention, shown in FIGURE 1, there is provided a semiobjective for a microscope, which is shown generally by reference numeral 10 and it comprises a front meniscus singlet lens member I having a positive focal length designated F(I). On lens member I, there is provided a front lens surface $-R_1$ which is concave toward a specimen surface 11 and is spaced therefrom by an axial distance designated $S_1$. The objective provides for the usage of a cover plate 13, which generally is 0.016F in thickness. The rear surface of lens member I is also concave toward surface 11 and is designated $-R_2$; however, lens surface $-R_2$ is comparatively more weakly curved than is lens surface $-R_1$. Surface $-R_1$ is spaced from surface $-R_2$ by an axial distance $t_1$.

It will be hereinafter understood that that the use of a minus (—) sign with any R reference designation or value signifies that the center of curvature of the particular lens surface lies in front of the surface, i.e., the surface is concavely curved toward the specimen surface 11.

Rearwardly along an optical axis 12, there is provided a singlet double convex lens member II which is optically aligned with lens member I. The front and rear lens surfaces of lens member II are designated $R_3$ and $-R_4$ respectively, the rear surface $-R_4$ being comparatively more strongly curved than $R_3$. The front surface $R_3$ is spaced a distance $S_2$ from lens member I along the optical axis 12. Lens member II has an axial thickness which is designated $t_2$.

Spaced rearwardly of lens member II at an axial distance $S_3$ along axis 12 is a first positive doublet lens member III, which includes a front double concave lens element IIIa which lies in surface contact with a rear double convex lens element IIIb. The front and rear lens surfaces of the doublet are designated $-R_5$ and $-R_7$ respectively while the interfacing surfaces are designated $R_6$. Lens elements IIIa and IIIb have axial thickness which are designated $t_3$ and $t_4$ respectively.

At an axial distance $S_4$ rearwardly of lens member III is located a second positive doublet lens member IV, which includes a front double convex lens element IVa which lies in surface contact with a rear double concave lens element IVb. The front and rear surfaces of lens member IV are designated $R_8$ and $R_{10}$ respectively, the front surface $R_8$ being comparatively more strongly curved than $R_{10}$. The interfacing surfaces are designated $-R_9$. Lens elements IVa and IVb have axial thicknesses which are designated $t_5$ and $t_6$, respectively.

At an axial distance $S_5$ rearwardly of lens member IV and optically aligned therewith, is the aforementioned field flattening and aberration correcting lens member V. The meniscus form and optical properties of lens member V are prescribed as stated hereinabove so that the best average correction of aberrations and field curvature is afforded by lens member V when used interchangeably with a plurality of semiobjectives having different magnifying powers within a range of 5× to 100×, for example. Lens member V includes a front positive double convex lens element Va which lies in surface contact with a rear negative double concave lens element Vb, the axial thicknesses thereof being $t_7$ and $t_8$ respectively. Doublet lens member V has front and rear lens surfaces which are designated $R_{11}$ and $R_{13}$ respectively while the interfacing lens surfaces are designated $-R_{12}$.

Also spaced rearwardly of lens member IV by an axial distance designated $S_6$ is located a diaphragm 14 for blocking stray light rays from entering the negative corrector lens member V. The diaphragm has a diameter which is designated D.

It will be understood, that such a diaphragm may be located at any point along the optical axis 12 where there is sufficient interlens air space to accommodate the diaphragm. So located, the diaphragm will continue to serve its function. The diaphragm may also be incorporated as an added function of the mounting of a lens member, if necessary. In addition, the diaphragm may be removed or eliminated from the optical system without drastic degradation of the optical performance. However, there is an optimum position in which to locate a diaphragm, it is so located in the preferred embodiment of the present invention.

The constructional data determined for the final design of the semiobjective 10 together with the negative corrector and field flattening lens member V is the result of careful calculation and experiment and is set forth in ranges of values which invariably produce a successful optical system, this data is set forth in the tables hereinbelow.

With regard to the optical parameters in Table I, it will be seen that the values of each parameter are given in ranges of values which include a nominal or ideal value. These ranges of values are prescribed for the primary purpose of facilitating the manufacture of the lens elements to commercial standards.

It is well known in the art that it is practically impossible to manufacture a run of lens elements economically while holding all of the lens parameters to specific ideal values. Therefore, the lens designer specifies limits or tolerances, i.e., ranges of values for each lens parameter within which the lens elements may be economically manufactured while still producing a completed objective or lens system which is capable of good and acceptable optical performance.

The technique used by the manufacturer is to separate out and classify the lens elements according to size increments which fall within the ranges of values and then selectively assemble from the lens classes a complete set of lens elements which are complementary to each other in reducing unwanted image aberrations. This technique is highly successful in producing economically commercially acceptable optical objectives having good optical performance.

In Table I, herebelow, wherein the ranges of values of the constructinonal parameters are given, F(I), F(II), F(III), F(IV), and —F(V) represent the equivalent focal lengths of the successive lens members I, II, III, IV, and V, respectively, in terms of F, the equivalent focal length of the entire system of lenses. The equivalent focal length of the lens elements IIIa, IIIb, IVa, IVb, Va, and Vb are designated —F(IIIa), F(IIIb), F(IVa), —F(IVb), F(Va), and —F(Vb) respectively, the minus (—) sign meaning negative focal length. The other designations are as specified hereinabove.

TABLE I

| | | |
|---|---|---|
| 8.883F | <F(I) | <9.241F |
| 2.349F | <F(II) | <2.445F |
| 60.291F | <F(III) | <61.729F |
| 4.051F | <F(IV) | <4.217F |
| 2.952F | <—F(V) | <3.072F |
| 1.652F | <—F(IIIa) | <1.720F |
| 1.685F | <F(IIIb) | <1.753F |
| 1.540F | <F(IVa) | <1.604F |
| 2.481F | <—F(IVb) | <2.577F |
| 1.640F | <F(Va) | <1.706F |
| 0.992F | <—F(Vb) | <1.032F |
| 0.306F | <$S_1$ | <0.318F |
| 0.172F | <$S_2$ | <0.190F |
| 0.755F | <$S_3$ | <0.773F |
| 0.018F | <$S_4$ | <0.036F |
| 0.416F | <$S_5$ | <0.432F |
| 0.095F | <$S_6$ | <0.131F |
| 1.310F | <$t_1$ | <1.328F |
| 0.331F | <$t_2$ | <0.349F |
| 0.127F | <$t_3$ | <0.145F |
| 0.332F | <$t_4$ | <0.350F |
| 0.285F | <$t_5$ | <0.295F |
| 0.314F | <$t_6$ | <0.332F |
| 0.217F | <$t_7$ | <0.235F |
| 0.127F | <$t_8$ | <0.145F |
| 1.059F | <—$R_1$ | <1.079F |
| 1.307F | <—$R_2$ | <1.311F |
| 3.103F | <$R_3$ | <3.121F |
| 2.582F | <—$R_4$ | <2.596F |
| 43.866F | <—$R_5$ | <47.784F |
| 1.058F | <$R_6$ | <1.060F |
| 2.270F | <—$R_7$ | <2.282F |
| 1.181F | <$R_8$ | <1.185F |
| 1.487F | <—$R_9$ | <1.493F |
| 39.241F | <$R_{10}$ | <41.321F |
| 3.661F | <$R_{11}$ | <3.687F |
| 1.855F | <—$R_{12}$ | <1.861F |
| 0.956F | <$R_{13}$ | <0.958F |
| 0.774F | <D | <0.784F |

Furthermore, the dimensionless numerical ranges of values are given in Table II herebelow for the refractive index $n_D$ and the Abbe number $\nu$ of the glasses used in the successive lens elements I to Vb.

TABLE II

| | | |
|---|---|---|
| 1.6015 | $<n_D(I)$ | $<1.6045$ |
| 1.6015 | $<n_D(II)$ | $<1.6045$ |
| 1.6115 | $<n_D(IIIa)$ | $<1.6145$ |
| 1.4328 | $<n_D(IIIb)$ | $<1.4348$ |
| 1.4328 | $<n_D(IVa)$ | $<1.4348$ |
| 1.6115 | $<n_D(IVb)$ | $<1.6145$ |
| 1.7486 | $<n_D(Va)$ | $<1.7526$ |
| 1.6115 | $<n_D(Vb)$ | $<1.6145$ |
| 64.9 | $<\nu(I)$ | $<65.9$ |
| 64.9 | $<\nu(II)$ | $<65.9$ |
| 43.9 | $<\nu(IIIa)$ | $<44.5$ |
| 94.5 | $<\nu(IIIb)$ | $<95.9$ |
| 94.5 | $<\nu(IVa)$ | $<95.9$ |
| 43.9 | $<\nu(IVb)$ | $<44.5$ |
| 27.6 | $<\nu(Va)$ | $<28.0$ |
| 43.9 | $<\nu(Vb)$ | $<44.5$ |

More specifically, Table III herebelow presents the substantially nominal values for the parameters stated in the preceding tables. The specific constructional data is given substantially in terms of F, and the glass properties $n_D$ and $\nu$ remain dimensionless numerical values.

TABLE III $F(I) = 9.062F$
$F(II) = 2.397F$
$F(III) = 61.010F$
$-F(IIIa) = 1.686F$
$F(IIIb) = 1.719F$
$F(IV) = 4.134F$
$F(IVa) = 1.572F$
$-F(IVb) = 2.529F$
$-F(V) = 3.012F$
$F(Va) = 1.673F$
$-F(Vb) = 1.012F$
$-F(IIIa)/F(IIIb) = 0.981$ subst.
$F(Va)/-F(Vb) = 0.622$ subst.
$F(Va)/-F(IVb = 0.622$ subst.

$S_1 = 0.312F$
$S_2 = 0.181F$
$S_3 = 0.764F$
$S_4 = 0.027F$
$S_5 = 0.424F$
$S_6 = 0.113F$ $t_1 = 1.319F$
$t_2 = 0.340F$
$t_3 = 0.136F$
$t_4 = 0.341F$
$t_5 = 0.290F$
$t_6 = 0.323F$
$t_7 = 0.226F$
$t_8 = 0.136F$ $-R_1 = 1.069F$
$-R_2 = 1.309F$
$R_3 = 3.112F$
$-R_4 = 2.589F$
$-R_5 = 45.825F$
$R_6 = 1.059F$
$-R_7 = 2.276F$
$R_8 = 1.183F$
$-R_9 = 1.490F$
$R_{10} = 40.281F$
$R_{11} = 3.674F$
$-R_{12} = 1.858F$
$R_{13} = 0.957F$ $D = 0.779F$
$n_D(I) = 1.6030$
$n_D(II) = 1.6030$
$n_D(IIIa) = 1.6130$
$n_D(IIIb) = 1.4338$
$n_D(IVa) = 1.4338$
$n_D(IVb) = 1.6130$
$n_D(Va) = 1.7506$
$n_D(Vb) = 1.6130$ $\nu(I) = 65.4$
$\nu(II) = 65.4$
$\nu(IIIa) = 44.2$
$\nu(IIIb) = 95.2$
$\nu(IVa) = 95.2$
$\nu(IVb) = 44.2$
$\nu(Va) = 27.8$
$\nu(Vb) = 44.2$

Figure 2:
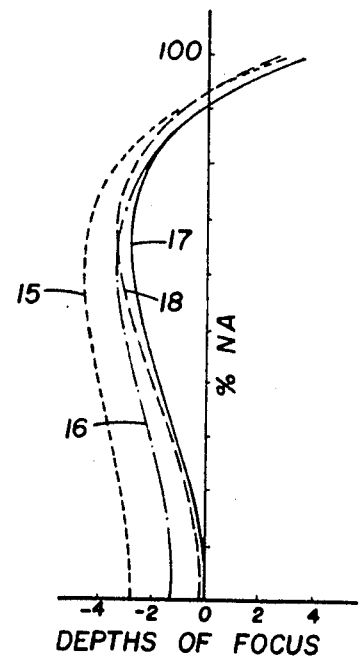
FIGURE 2 is a graphical representation of the performance of the complete micro-objective in correcting spherical and chromatic aberrations.

Referring now to FIGURE 2, there are shown plotts of spherochromatism for the entire objective disclosed herein. Spherochromatism is the spherical aberration of the lens system using different monochromatic light sources, therefore, it is an excellent test for the degree of correction for both the spherical and the chromatic aberrations that is contained in the lens system.

It will be apparent, by reference to the plots, that the change in depth of focus from the center to the edge of the numerical aperture is very good for all of the four colors checked. It should be remembered that this is the criteria necessary for an apochromatic lens system, i.e., that it be corrected for spherical aberration and chromatic aberration for at least four different wavelengths of light. The greatest change in depth of focus occurs at approximately 60% of the numerical aperture on curve 15 using light of 4340 Angstrom unit wavelength, the Frauenhofer G' line, and it totals only 4.3 depths of focus. The other curves 16, 17, 18, for 4861 Angstrom unit wavelength light, the Frauenhofer F line, 5896 Angstrom unit wavelength light, the Frauenhofer D line, and 6563 Angstrom unit wavelength light, the Frauenhofer C line, vary even less from the ideal condition.

While there has been shown and described in detail only one particular form of the present invention, it will be obvious to those skilled in the art that various changes and modifications may be made in the optical details within the ranges of values stated hereinabove without departing from the invention.

I claim:
1. A microscope semiobjective which is used in cooperation with a prescribed negative field flattening and aberation correcting lens (V) having 5× magnification per se, the negative lens being interchangeably used with each one of a set of semiobjectives having a range of different low to high powers, the semiobjectives being parfocalized to each other, the field flattening lens and semiobjective being designed to cooperatively produce a total image magnification of 12.5× and numerical aperture of 0.30, the semiobjective producing substantially 2.5× magnification per se, the equivalent focal length of the field flattening lens being designated —F(V), the equivalent focal length of the semiobjective together with the field flattening lens being designated F, the semiobjective comprising;
    a singlet positive meniscus lens member (I) which is located adjacent to a specimen surface to be examined at an axial distance designated $S_1$ therefrom,
    a singlet double convex lens member (II) which is located at an axial distance designated $S_2$ rearwardly of lens member I,
    a first positive doublet lens member (III) which is located at an axial distance designated $S_3$ rearwardly of lens member II, member III including a front double concave lens element (IIIa) which lies in surface contact with a rear double convex lens element (IIIb),
    a second positive doublet lens member (IV) which is located at an axial distance designated $S_4$ rearwardly of lens member III, member IV including a front double convex lens element (IVa) which lies in surface contact with a rear double concave lens element (IVb),
    lens member IV being located at an axial distance designated $S_5$ from the negative field flattening lens member (V) which includes a front double convex lens element (Va) which lies in surface contact with a rear double concave lens element (Vb), the ranges of values, in terms of F, for the constructional data by which the lens members and lens elements thereof I to Vb are formed being given in the first table hereinbelow, wherein F(I) to F(IV) designate the focal length of the successive lens members and −F(V) designates the focal length of the negative field flattening lens, the minus (−) sign meaning negative focal length, the designations −F(IIIa), F(IIIb), F(IVa), −F(IVb), F(Va), and −F(Vb) pertaining to the respective lens elements aforementioned, the designations $t_1$ to $t_8$ relating to the axial thicknesses of the successive lens members and elements, and the designations $S_1$ to $S_5$ being the successive interlens airspaces numbering from the specimen surface rearwardly, and

TABLE

| | | |
|---|---|---|
| 8.883F | <F(I) | <9.241F |
| 2.349F | <F(II) | <2.445F |
| 60.291F | <F(III) | <61.729F |
| 4.051F | <F(IV) | <4.217F |
| 2.952F | <−F(V) | <3.072F |
| | −F(IIIa)/−(IIIb) | =0.981 subst. |
| | F(IVa)/−(IVb) | =0.622 subst. |
| | F(Va)/−F(Vb) | =1.653 subst. |
| 1.310F | <$t_1$ | <1.328F |
| 0.331F | <$t_2$ | <0.349F |
| 0.127F | <$t_3$ | <0.145F |
| 0.332F | <$t_4$ | <0.350F |
| 0.285F | <$t_5$ | <0.295F |
| 0.314F | <$t_6$ | <0.332F |
| 0.217F | <$t_7$ | <0.235F |
| 0.127F | <$t_8$ | <0.145F |
| 0.306F | <$S_1$ | <0.318F |
| 0.172F | <$S_2$ | <0.190F |
| 0.755F | <$S_3$ | <0.773F |
| 0.018F | <$S_4$ | <0.036F |
| 0.416F | <$S_5$ | <0.432F | the ranges of dimensionless numerical values for the refractive index $n_D$ relating to the glasses from which the successive lens elements I to Vb are made are given in the second table appearing herebelow.

| | | |
|---|---|---|
| 1.6015 | <$n_D$(I) | <1.6045 |
| 1.6015 | <$n_D$(II) | <1.6045 |
| 1.6115 | <$n_D$(IIIa) | <1.6145 |
| 1.4328 | <$n_D$(IIIb) | <1.4348 |
| 1.4328 | <$n_D$(IVa) | <1.4348 |
| 1.6115 | <$n_D$(IVb) | <1.6145 |
| 1.7486 | <$n_D$(Va) | <1.7526 |
| 1.6115 | <$n_D$(Vb) | <1.6145 |

2. The microscope semiobjective as claimed in claim 1 wherein said glasses from which said successive lens elements I to Vb are made are further characterized by the ranges of dimensionless numerical values for the Abbe number $\nu$ as given in the third table appearing herebelow.

| | | |
|---|---|---|
| 64.9 | <$\nu$(I) | <65.9 |
| 64.9 | <$\nu$(II) | <65.9 |
| 43.9 | <$\nu$(IIIa) | <44.5 |
| 94.5 | <$\nu$(IIIb) | <95.9 |
| 94.5 | <$\nu$(IVa) | <95.9 |
| 43.9 | <$\nu$(IVb) | <44.5 |
| 27.6 | <$\nu$(Va) | <28.0 |
| 43.9 | <$\nu$(Vb) | <44.5 |

3. A microscope semiobjective as claimed in claim 2 wherein the specific values, in terms of F, for the construction data by which said lens members and lens elements thereof are formed being given substantially in the fourth table hereinbelow, wherein F(I) to F(IV) designate the focal lengths of said lens members and −F(V) designates the focal length of said field flattening lens, the minus (−) sign meaning negative focal length, the designation −F(IIIa), F(IIIb), F(IVa), −F(IVb), F(Va), and −F(Vb) pertaining to said respective lens elements aforementioned, the designations $t_1$ to $t_8$ represent the axial thicknesses of said successive lens elements numbering from the front, and $S_1$ to $S_5$ being the successive interlens airspaces numbering from said specimen surface rearwardly, and F(I) = 9.062F
F(II) = 2.397F
F(III) = 61.010F
F(IV) = 4.134F
−F(V) = 3.012F
−F(IIIa)/F(IIIb) = 0.981 subst.
F(IVa)/−F(IVb) = 0.622 subst.
F(Va)/−F(Vb) = 1.653 subst.

$t_1$ = 1.319F
$t_2$ = 0.340F
$t_3$ = 0.136F
$t_4$ = 0.341F
$t_5$ = 0.290F
$t_6$ = 0.323F
$t_7$ = 0.226F
$t_8$ = 0.136F $S_1$ = 0.312F
$S_2$ = 0.181F
$S_3$ = 0.764F
$S_4$ = 0.027F
$S_5$ = 0.424F wherein the specific values for the refractive index $n_D$ and the Abbe number $\nu$ relating to the glasses from which the successive lens elements I to Vb are made being given substantially in the fifth table appearing herebelow.

$n_D$(I) = 1.6030
$n_D$(II) = 1.6030
$n_D$(IIIa) = 1.6130
$n_D$(IIIb) = 1.4338
$n_D$(IVa) = 1.4338
$n_D$(IVb) = 1.6130
$n_D$(Va) = 1.7506
$n_D$(Vb) = 1.6130

$\nu$(I) = 65.4
$\nu$(II) = 65.4
$\nu$(IIIa) = 44.2
$\nu$(IIIb) = 95.2
$\nu$(IVa) = 95.2
$\nu$(IVb) = 44.2
$\nu$(Va) = 27.8
$\nu$(Vb) = 44.2

4. A microscope semiobjective as claimed in claim 3, wherein said semiobjective is further characterized by the inclusion of a diaphragm which is spaced rearwardly of said lens member IV at an axial distance, in terms of F, 0.113F, and having a diameter, also in terms of F, of 0.779F.

5. A microscope semiobjective which is used in co-operation with a prescribed negative field flattening and aberration correcting lens (V) having 5× magnification per se, the negative lens being interchangeably used with each one of a set of semiobjectives having a range of different low to high powers, the semiobjectives being parfocalized to each other, the field flattening lens and semiobjective being designed to cooperatively produce a total image magnification of 12.5× and numerical aperture of 0.30, the semiobjective producing substantially 2.5× magnification per se, the equivalent focal length of the field flattening lens being designated −F(V), the equivalent focal length of the semiobjective together with the field flattening lens being designated F, the semiobjective comprising;

a front singlet positive meniscus lens member (I) which is located adjacent to a specimen surface to be examined at an axial distance designated $S_1$ therefrom, a singlet double convex lens member (II) which is located at an axial distance designated $S_2$ rearwardly of lens member I, a first positive doublet lens member (III) which is located at an axial distance designated $S_3$ rearwardly of lens member II, member III including a front double concave lens element (IIIa) which lies in surface contact with a rear double convex lens element (IIIb), a second positive doublet lens member (IV) which is located at an axial distance designated $S_4$ rearwardly of lens member III, member IV including a front double convex lens element (IVa) which lies in surface contact with a rear double concave lens element (IVb), lens member IV being located at an axial distance designated $S_5$ from the negative field flattening lens member (V) which includes a front double convex lens element (Va) which lies in surface contact with a rear double concave lens element (Vb), the ranges of values, in terms of F, for the constructional data by which the lens members and lens elements thereof I to Vb are formed being given in the first table hereinbelow, wherein $-R_1$ to $-R_{13}$ represent the successive radii of the lens surfaces formed on the lens members and lens elements thereof I to Vb numbering from the front, the minus (—) sign meaning that the lens surface so identified has its center of curvature located on the front side of the lens surface, the designation $t_1$ to $t_8$ relating to the axial thicknesses of the successive lens elements numbering from the front, and the designations $S_1$ to $S_5$ being the successive interlens airspaces numbering from the specimen surface rearwardly, and

| | | |
|---|---|---|
| 1.059F | $<-R_1$ | $<1.079F$ |
| 1.307F | $<-R_2$ | $<1.311F$ |
| 3.103F | $<R_3$ | $<3.121F$ |
| 2.582F | $<-R_4$ | $<2.596F$ |
| 43.866F | $<-R_5$ | $<47.784F$ |
| 1.058F | $<R_6$ | $<1.060F$ |
| 2.270F | $<-R_7$ | $<2.282F$ |
| 1.181F | $<R_8$ | $<1.185F$ |
| 1.487F | $<-R_9$ | $<1.493F$ |
| 39.241F | $<R_{10}$ | $<41.321F$ |
| 3.661F | $<R_{11}$ | $<3.687F$ |
| 1.855F | $<-R_{12}$ | $<1.861F$ |
| 0.956F | $<R_{13}$ | $<0.958F$ |
| 1.310F | $<t_1$ | $<1.328F$ |
| 0.331F | $<t_2$ | $<0.349F$ |
| 0.127F | $<t_3$ | $<0.145F$ |
| 0.332F | $<t_4$ | $<0.350F$ |
| 0.285F | $<t_5$ | $<0.295F$ |
| 0.314F | $<t_6$ | $<0.332F$ |
| 0.217F | $<t_7$ | $<0.235F$ |
| 0.127F | $<t_8$ | $<0.145F$ |
| 0.306F | $<S_1$ | $<0.318F$ |
| 0.172F | $<S_2$ | $<0.190F$ |
| 0.755F | $<S_3$ | $<0.773F$ |
| 0.018F | $<S_4$ | $<0.036F$ |
| 0.416F | $<S_5$ | $<0.432F$ | the ranges of dimensionless numerical values for the refractive index $n_D$ and the Abbé number $\nu$ relating to glasses from whch the successiive lens elements I to Vb are made being given in the second table appearing herebelow.

| | | |
|---|---|---|
| 1.6015 | $<n_D(I)$ | $<1.6045$ |
| 1.6015 | $<n_D(II)$ | $<1.6045$ |
| 1.6115 | $<n_D(IIIa)$ | $<1.6145$ |
| 1.4328 | $<n_D(IIIb)$ | $<1.4348$ |
| 1.4328 | $<n_D(IVa)$ | $<1.4348$ |
| 1.6115 | $<n_D(IVb)$ | $<1.6145$ |
| 1.7486 | $<n_D(Va)$ | $<1.7526$ |
| 1.6115 | $<n_D(Vb)$ | $<1.6145$ |
| 64.9 | $<\nu(I)$ | $<65.9$ |
| 64.9 | $<\nu(II)$ | $<65.9$ |
| 43.9 | $<\nu(IIIa)$ | $<44.5$ |
| 94.5 | $<\nu(IIIb)$ | $<95.9$ |
| 94.5 | $<\nu(IVa)$ | $<95.9$ |
| 43.9 | $<\nu(IVb)$ | $<44.5$ |
| 27.6 | $<\nu(Va)$ | $<28.0$ |
| 43.9 | $<\nu(Vb)$ | $<44.5$ |

6. A microscope semiobjective as claimed in claim 5 wherein the specific values, in terms of F, for the constructional data by which said lens members and lens elements thereof I to Vb are formed being given substantially in the third table hereinbelow, wherein $-R_1$ to $R_{13}$ represent said successive radii of said lens surface formed on said lens elements I to Vb numbering from the front, the minus (—) sign meaning that the lens surface so identified has its center of curvature located on the front side of the surface, the designations $t_1$ to $t_8$ represent the axial thicknesses of said successive lens elements numbering from the front, and $S_1$ to $S_5$ represent said successive interlens airspaces numbered from said specimen surface rearwardly, and $-R_1=1.069F$
$-R_2=1.309F$
$R_3=3.112F$
$-R_4=2.589F$
$-R_5=45.825F$
$R_6=1.059F$
$-R_7=2.276F$
$R_8=1.183F$
$-R_9=1.490F$
$R_{10}=40.281F$
$R_{11}=3.674F$
$-R_{12}=1.858F$
$R_{13}=0.957F$ $t_1=1.319F$
$t_2=0.340F$
$t_3=0.136F$
$t_4=0.341F$
$t_5=0.290F$
$t_6=0.323F$
$t_7=0.226F$
$t_8=0.136F$ $S_1=0.312F$
$S_2=0.181F$
$S_3=0.764$
$S_4=0.027F$
$S_5=0.424F$ wherein the specific dimensionless numerical values for the refractive index $n_D$ and the Abbé number $\nu$ relating to the glasses from which said successive lens elements I to Vb are made being given substantially in the fourth table herebelow.

$n_D(I)=1.6030$
$n_D(II)=1.6030$
$n_D(IIIa)=1.6130$
$n_D(IIIb)=1.4338$
$n_D(IVa)=1.4338$
$n_D(IVb)=1.6130$
$n_D(Va)=1.7506$
$n_D(Vb)=1.6130$ $\nu(I)=65.4$
$\nu(II)=65.4$
$\nu(IIIa)=44.2$
$\nu(IIIb)=95.2$
$\nu(IVa)=95.2$
$\nu(IVb)=44.2$
$\nu(Va)=27.8$
$\nu(Vb)=44.2$

7. A microscope semiobjective as claimed in claim 6, wherein said semiobjective is further characterized by the inclusion of a diaphragm which is spaced rearwardly of lens member IV at an axial distance, in terms of F, of 0.113F, and having a diameter, also in terms of F, of 0.799F.

References Cited

UNITED STATES PATENTS 3,174,396  3/1965  Ruben.
3,428,389  2/1969  Judd.

DAVID SCHONBERG, Primary Examiner

PAUL A. SACHER, Assistant Examiner

U.S. Cl. X.R.

350—177

PO-1050
(5/69)

UNITED STATES PATENT OFFICE
CERTIFICATE OF CORRECTION

Patent No. 3,471,219   Dated October 7, 1969

Inventor(s) David L. St. Onge

It is certified that error appears in the above-identified patent and that said Letters Patent are hereby corrected as shown below:

Column 5, line 34, change "(Va)" to -- (IVa) --;
change "(Vb)" to -- (IVb) --;

line 35, change "(IVb" to -- (Vb) --;
change "0.622" to -- 1.653 --

SIGNED AND
SEALED
SEP 22 1970

(SEAL)
Attest:

Edward M. Fletcher, Jr.
Attesting Officer

WILLIAM E. SCHUYLER, JR.
Commissioner of Patents